US 6,728,698 B2

(12) United States Patent
Yen et al.

(10) Patent No.: US 6,728,698 B2
(45) Date of Patent: Apr. 27, 2004

(54) METHOD AND SYSTEM FOR INTERACTION BETWEEN A BROWSER ENGINE AND AN APPLICATION

(75) Inventors: Hsiang Tsun Yen, Taipei (TW); Chien Sen Weng, Taipei (TW); Luke Taylor, Taipei (TW)

(73) Assignee: BENQ Corporation, Taoyuan (TW)

( * ) Notice: Subject to any disclaimer, the term of this patent is extended or adjusted under 35 U.S.C. 154(b) by 310 days.

(21) Appl. No.: 09/818,535

(22) Filed: Mar. 28, 2001

(65) Prior Publication Data

US 2002/0032673 A1 Mar. 14, 2002

(30) Foreign Application Priority Data

Sep. 14, 2000 (TW) ........................................ 89119026 A

(51) Int. Cl.[7] .............................................. G06F 17/30
(52) U.S. Cl. ........................... 707/2; 345/744; 345/788; 345/800
(58) Field of Search ............................. 707/2; 345/744, 345/788, 800, 810

(56) References Cited

U.S. PATENT DOCUMENTS

| | | | | |
|---|---|---|---|---|
| 5,768,510 A | * | 6/1998 | Gish | ..................... 395/200.33 |
| 5,983,190 A | * | 11/1999 | Trower, II et al. | ........... 704/276 |
| 5,987,611 A | * | 11/1999 | Freund | ........................ 713/201 |
| 5,999,972 A | * | 12/1999 | Gish | ........................... 707/219 |
| 6,157,930 A | * | 12/2000 | Ballard et al. | ............... 707/203 |
| 6,487,583 B1 | * | 11/2002 | Harvey et al. | ............... 709/204 |

* cited by examiner

Primary Examiner—Safet Metjahic
Assistant Examiner—Haythim J. Alaubaidi
(74) Attorney, Agent, or Firm—Quintero Law Office

(57) ABSTRACT

The present invention provides a method and system for interaction between a browser engine and an application. The application includes a plurality of function modules. When the application is initiated, it sends a request to the browser engine. After the browser engine receives the request, it downloads a browser display in response to the request. The browser display includes a plurality of function icons. Each of the function icons corresponds to one of the function modules of the application. When a user selects one function icon on the browser display, the browser engine initiate the function module of the application corresponding to the function icon so that the application executes a specific function.

16 Claims, 8 Drawing Sheets

METHOD AND SYSTEM FOR INTERACTION BETWEEN A BROWSER ENGINE AND AN APPLICATION

REFERENCE TO RELATED APPLICATION

The present application claims priority to Taiwan application No. 089119026, entitled "A Method and System for Interaction between a Browser Engine and an Application," filed on Sep. 14, 2000.

BACKGROUND OF THE INVENTION

1. Field of the Invention

The present invention relates to a method and system for interaction between a browser engine and an application.

2. Description of the Prior Art

With the rise of the Internet, browser applications, such as Microsoft's Internet Explore and Netscape's Navigator, have become essential applications on computers used for network communication. The convenience afforded by being able to download applications over the Internet and growing user demand for application upgrades, have made such downloading very popular, particular in the period after a new browser application is released.

Referring to FIG. 1 and FIG. 2, FIG. 1 is a perspective diagram of a prior art browser application 10 and FIG. 2 is a perspective diagram of a user interface 30 of the browser application 10 in FIG. 1. The browser application 10 comprises an initiation module 12 to initiate the browser application 10, a plurality of function modules 14, a user interface generation module 16 for generating a user interface 30, and a browser engine 18. The browser engine 18 comprises a download module 22 and a plurality of communication modules 24.

As shown in FIG. 2, the user interface 30 comprises a web page display area 32 and a plurality of application function icons 34. The download module 22 is used to download a web page 36 from a server, the web page 36 then being displayed in the web page display area 32. The web page 36 comprises a plurality of communication icons 38. Each of the communication icons 38 corresponds to a communication module 24. When one communication icon 38 is selected, the browser engine 18 initiates the communication module 24, which corresponds to that particular communication icon 38 for network communication.

The prior art browser application comprises a browser engine, and application function modules. However, in a new version browser application, only the application function modules are updated so that the new version browser application can have more application functions, while the browser engine is not updated.

In addition, the fact that the browser engine 18 is part of the browser application package directly attributes to the massive size of the application and causes network congestion when downloading. Accordingly, the users have to spend a lot of time updating applications via Internet downloads. In such a situation, the users have to decide whether to forgo updating or spend time and money on time-consuming downloading.

In other words, during an update of the browser application, users have to download a full package browser application, including application function modules and a browser engine, despite the fact that it is the application function modules that are updated and not the browser engine. Indeed, the browser engine does not need to be updated and therefore downloaded from the server.

SUMMARY OF THE INVENTION

The primary objective of the present invention is therefore to provide a method and system for interaction between a browser engine and an application that resolves the above-mentioned problems.

In a preferred embodiment, the present invention provides a method and system for interaction between a browser engine and an application. The application comprises a plurality of function modules. When the application is initiated, it sends a request to the browser engine. After the browser engine receives the request, it downloads a browser display in response to said request. The browser display comprises a plurality of function icons. Each of the function icons corresponds to one of the function modules of the application. When users select any of the function icons on the browser display, the browser engine initiates the function module of the application corresponding to the function icon chosen to render a specific function.

The feature of the application according to the present invention lies in the fact that the application serves the same functions as the prior art browser application, via its method and system for interaction between a browser engine and the application.

These and other objectives of the present invention will no doubt become obvious to those of ordinary skill in the art after having read the following detailed description of the preferred embodiment, which is illustrated in the various figures and drawings.

BRIEF DESCRIPTION OF THE DRAWINGS

The following detailed description, given by way of example and not intended to limit the invention to the embodiments described herein, is best understood in conjunction with the accompanying drawings, in which.

DETAILED DESCRIPTION OF THE PREFERRED EMBODIMENT

Figure 1:
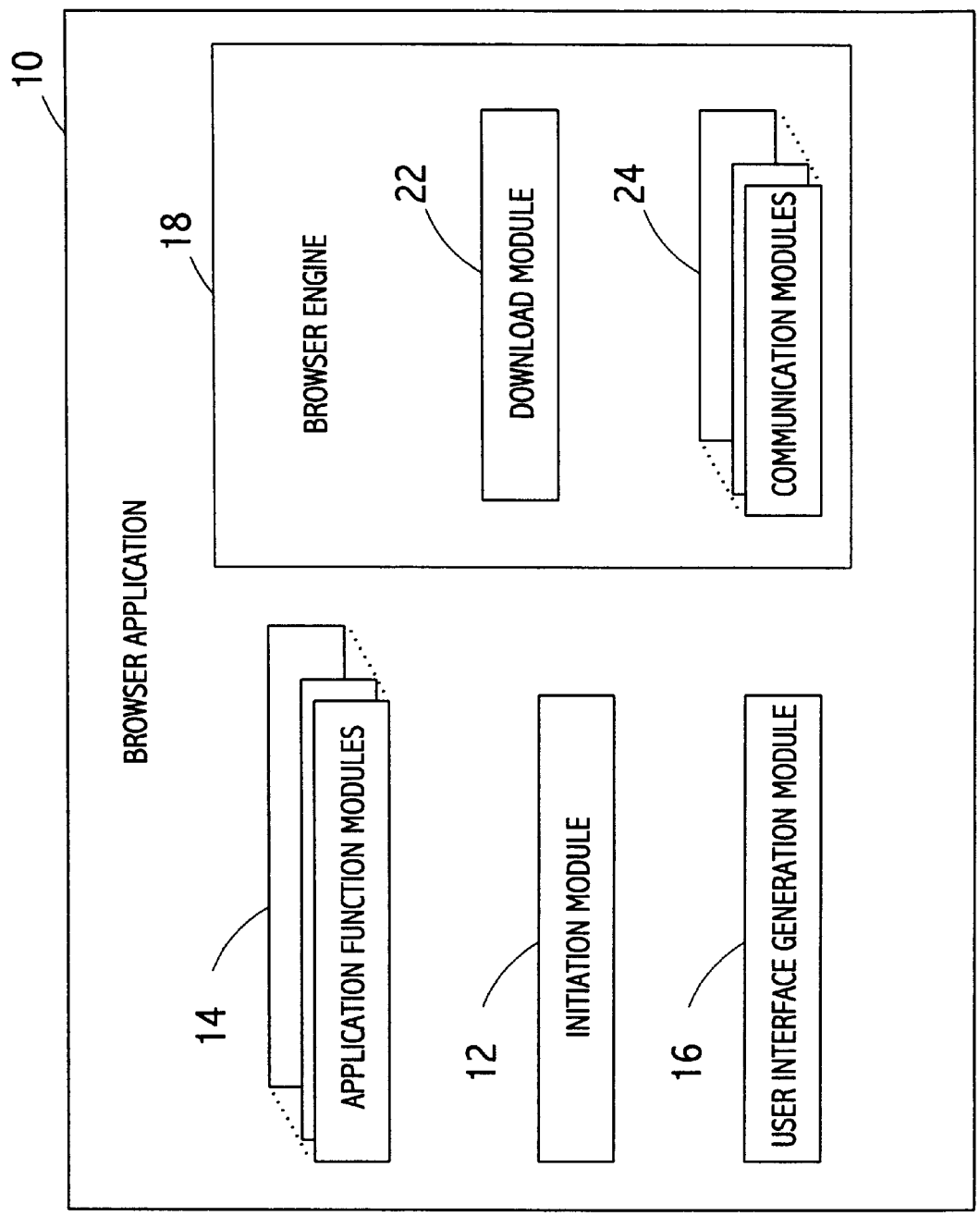
FIG. 1 is a perspective diagram of a prior art browser application.
Figure 2:
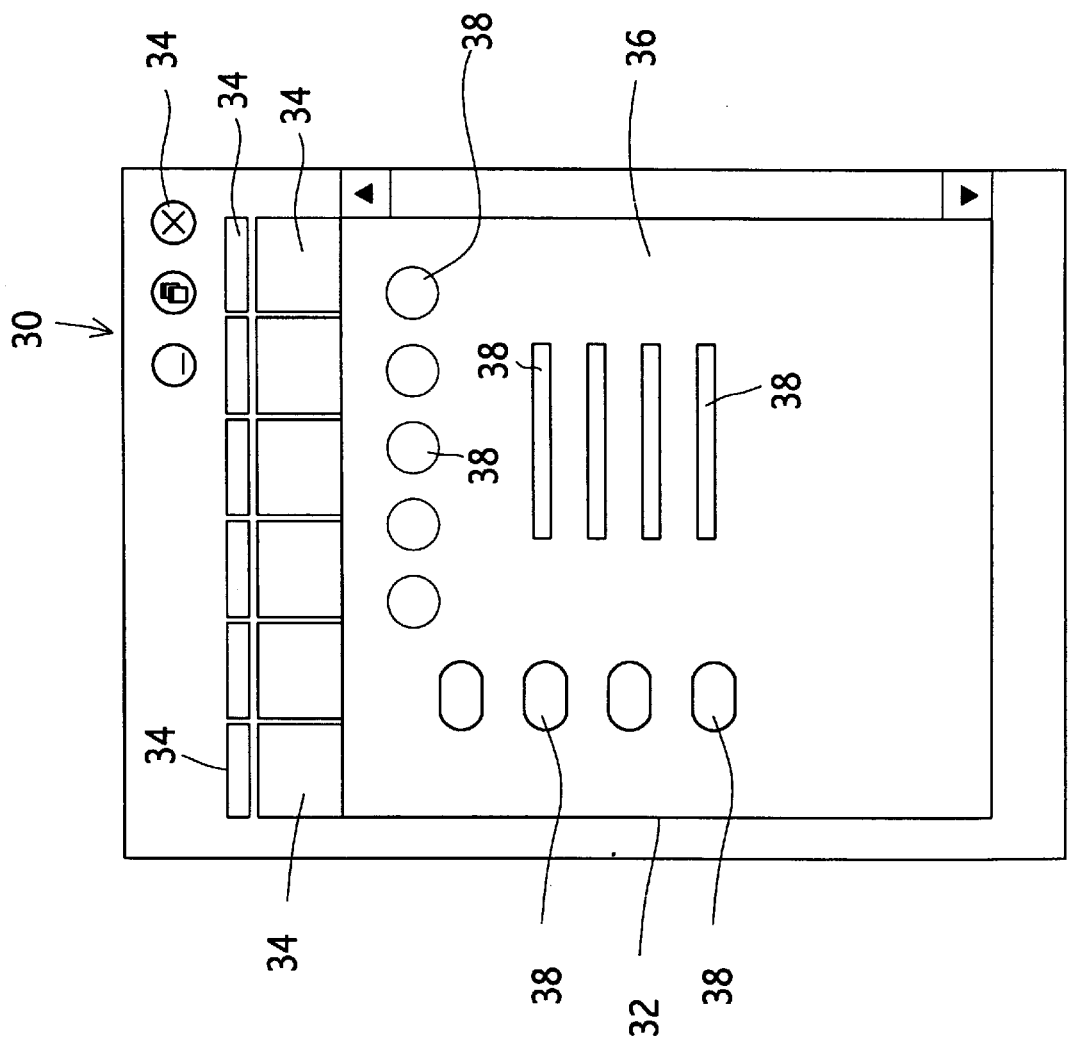
FIG. 2 is a perspective diagram of the browser application's user interface in FIG. 1.
Figure 3:
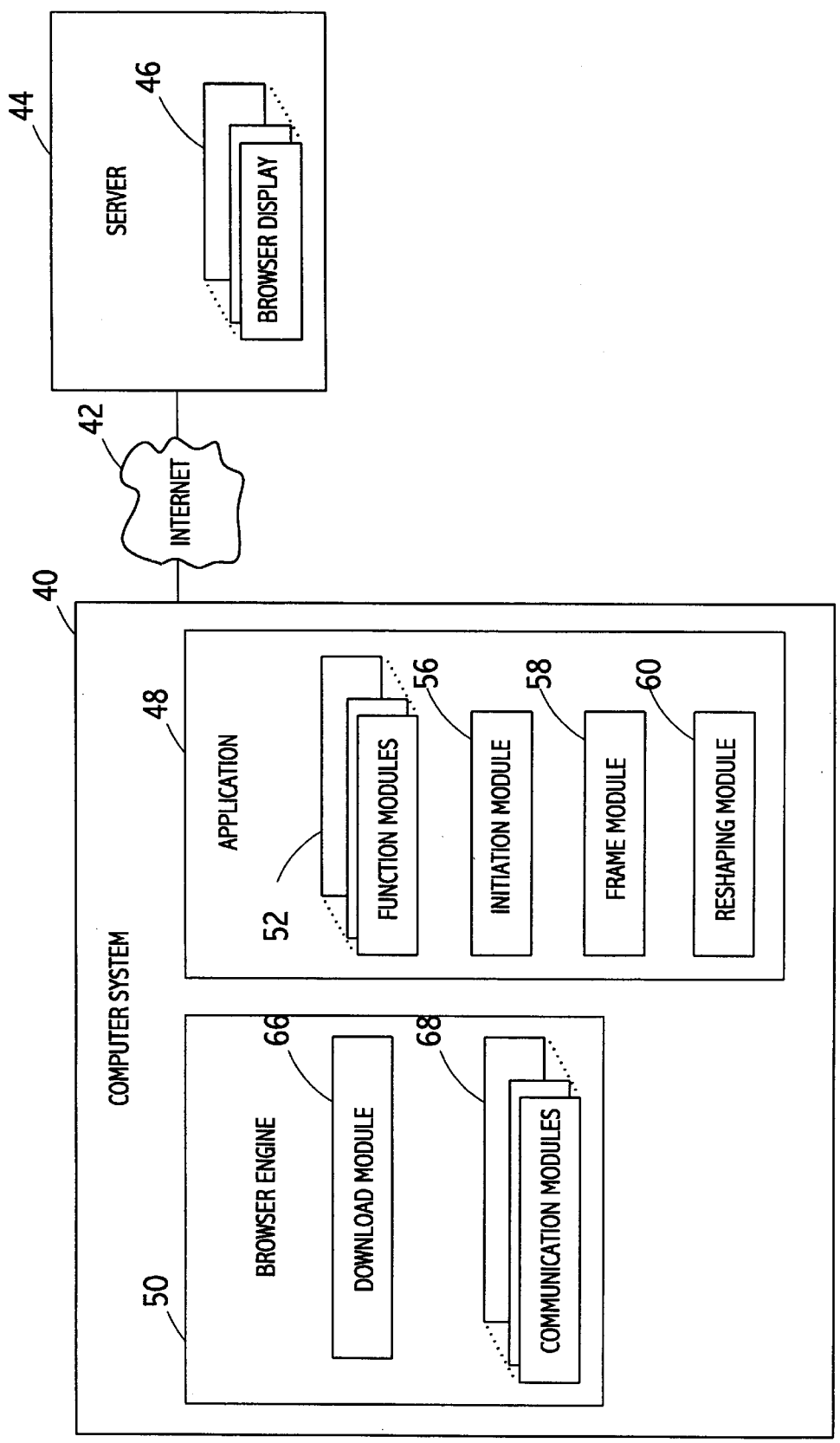
FIG. 3 is a perspective diagram of a computer system according to the present invention.

Referring to FIG. 3, which illustrates a perspective diagram of a computer system 40 according to the present invention. The computer system 40 is connected to a server 44 via the Internet 42. The server 44 comprises a plurality of browser displays 46. The computer system 40 comprises an application 48 and a browser engine 50. The application 48 comprises a plurality of function modules 52, an initiation module 56, a frame module 58, and a reshaping module 60. The browser engine 50 comprises a download module 66 and a plurality of communication modules 68.

Figure 4:
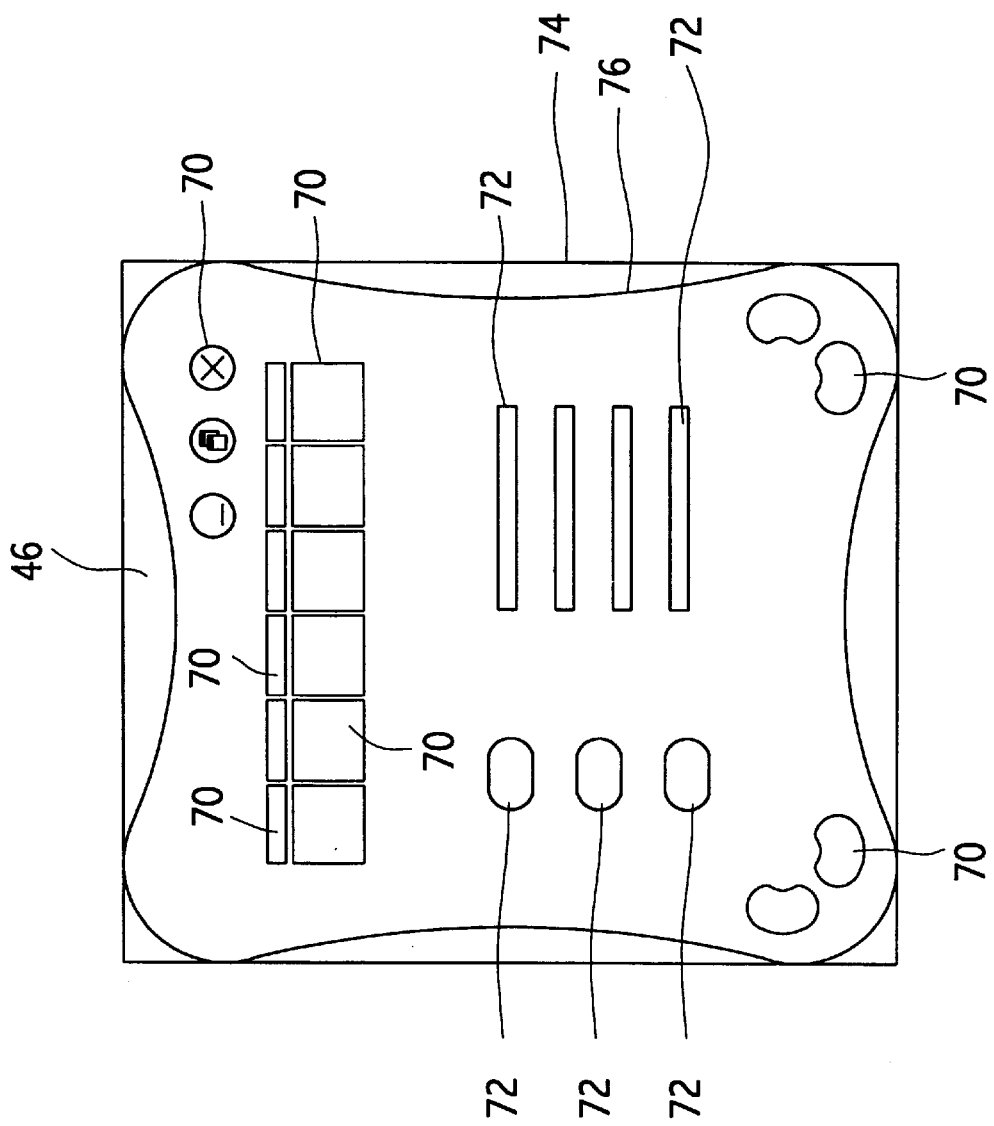
FIG. 4 is a perspective diagram of a browser display.

FIG. 4 illustrates a perspective diagram of a browser display 46. The browser display 46 can be considered a browser interface. The browser display 46 comprises a plurality of function icons 70 and a plurality of communication icons 72. Each function icon 70 corresponds to a function module of the application 48, and each communication icon 72 corresponds to a communication module 68.

Figure 5:
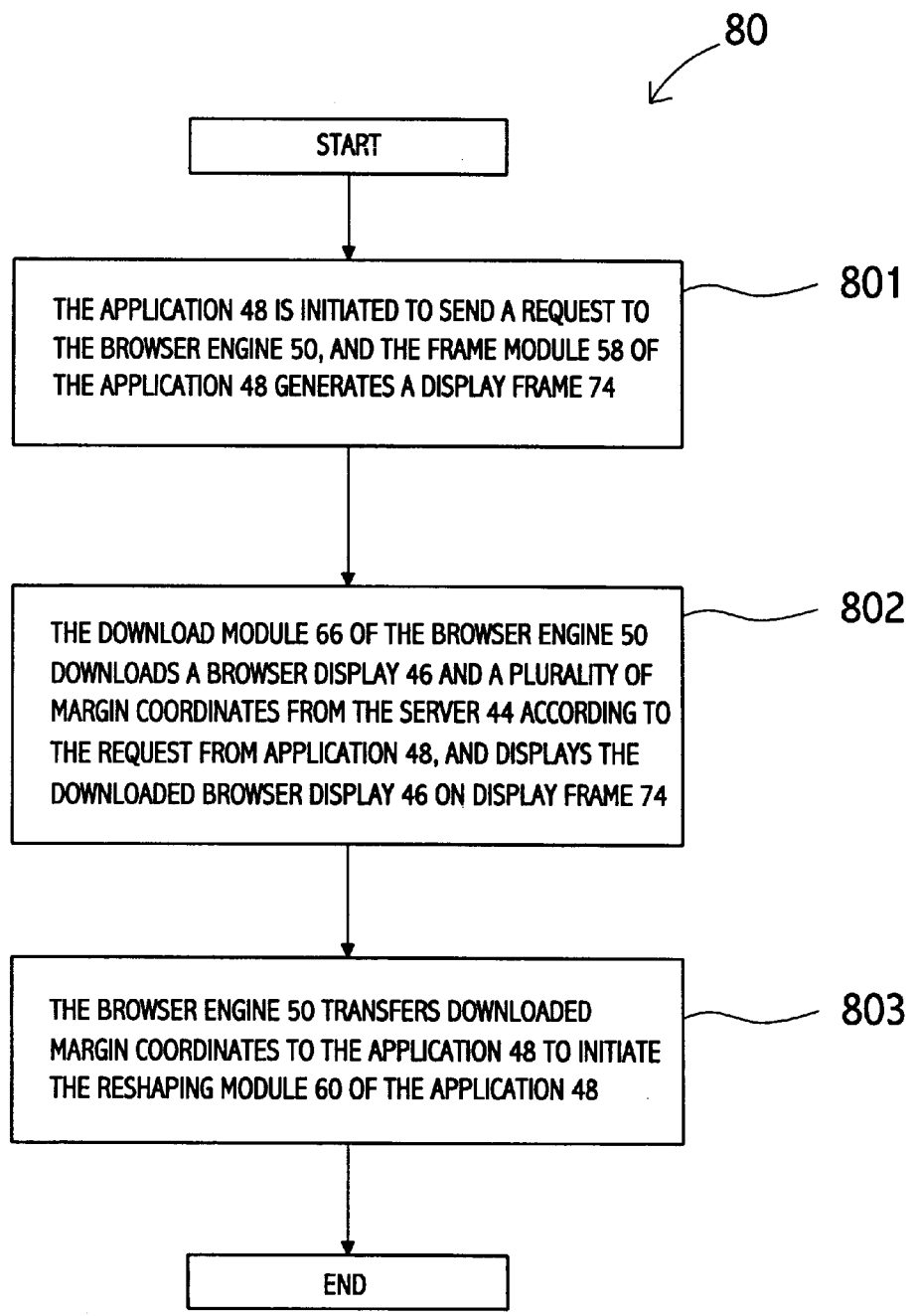
FIG. 5 is a flow chart diagram of a method according to the present invention.

FIG. 5 illustrates a flow chart diagram of a method 80 according to the present invention. The method comprises steps 801–803. In step 801, the application 48 is initiated to send a request to the browser engine 50, and the frame module 58 of the application 48 generates a display frame 74. In step 802, the download module 66 of the browser engine 50 downloads a browser display 46 and a plurality of margin coordinates from the server 44 according to the request from application 48, and displays the downloaded browser display 46 on display frame 74. In step 803, the browser engine 50 transfers downloaded margin coordinates to the application 48 to initiate the reshaping module 60 of the application 48. The reshaping module 60 forms a margin line 76 (Referring to FIG. 4) on the display frame 74 according to the margin coordinates and deletes the display region of the display frame 74 beyond the margin line 76.

If the download module 66 of the browser engine 50 does not download the margin coordinates, the reshaping module 60 of the application 48 will not be initiated. In such a situation the browser engine 50 displays the downloaded browser display 46 on the display frame 74, and the reshaping step 803 is not executed.

When one function icon 70 on the browser display 46 is selected by a user of the computer system 40, the function module 52 of the application program 48 corresponding to the function icon 70 is initiated by the browser engine 50 so that the application program 48 executes a specific function. For example, if the function icon 70 is a close function icon, the application 48 is closed when the user selecting the close function icon.

The function icon 70 can also be a miniature function icon. When the user selects the miniature function icon, the display image of the application 48 is minimized.

The function icon 70 can also be a data access function icon. When the user selects this data access function icon, the application 48 accesses data from a storage device in the computer 40.

Figure 6:
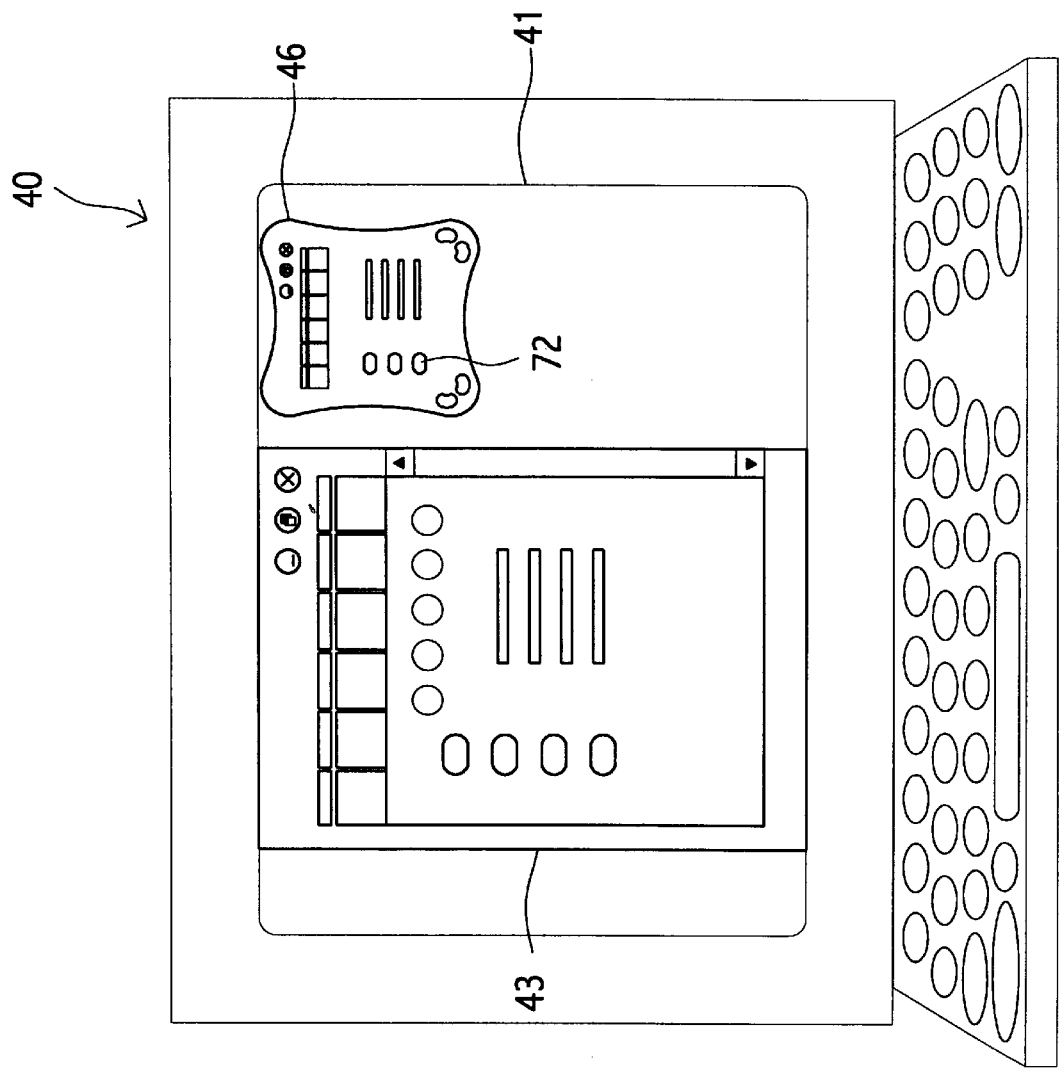
FIG. 6 is a perspective diagram of a screen display of the computer system according to the present invention.

FIG. 6 is a perspective diagram of a screen display 41 of the computer system 40 according to the present invention. When the user of the computer system 40 selects a communication icon 72 on the browser display 46, the browser engine 50 initiates the communication module 68 corresponding to the communication icon 72 for network communication. It follows that the browser engine 50 opens a browser application such as MicroSoft Explore and generates a browser application display 43 where a downloaded content web page is displayed.

The function of the application 48 is to generate a display frame 74. The browser engine 50 downloads the browser display 46, which is then displayed on the display frame 74 to form a user interface in the computer system 40. By selecting the function icons 70 on the browser display 46, users can either close the application 48 or hide the display image of the application 48. Moreover, by selecting the communication icon 72, the users can access networks. Therefore, the application 48 can perform the same functions as a browser application via interaction with the browser engine 50. By adding new function icons 70 to the browser display, new application functions can be added for users' convenience. When the computer system 40 updates the browser display 46, it serves the same purpose as updating a browser application. Updating a browser display according to the invention involves the same time and effort as downloading a web page.

Because the application does not include a browser engine, the size of the application 48 can be minimized. In a sense, the application acts like a reusable container, where different application logic and layout configurations are loaded. It not only provides various application functions and layouts by substituting application logic and layout configuration, it can do this automatically over the Internet. Users therefore no longer have to go through a time-consuming process to realize an application update.

Figure 7:
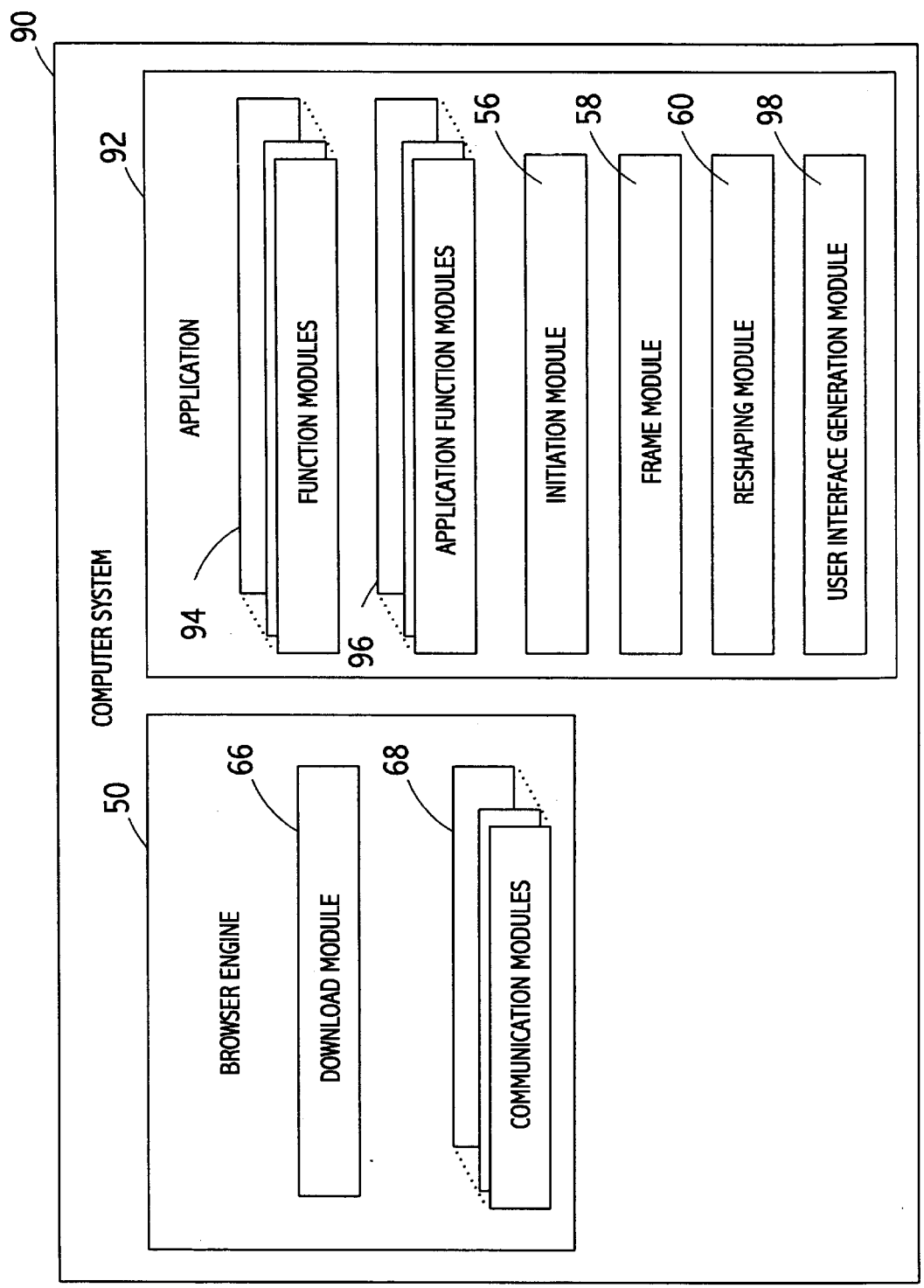
FIG. 7 is another computer system according to the invention.
Figure 8:
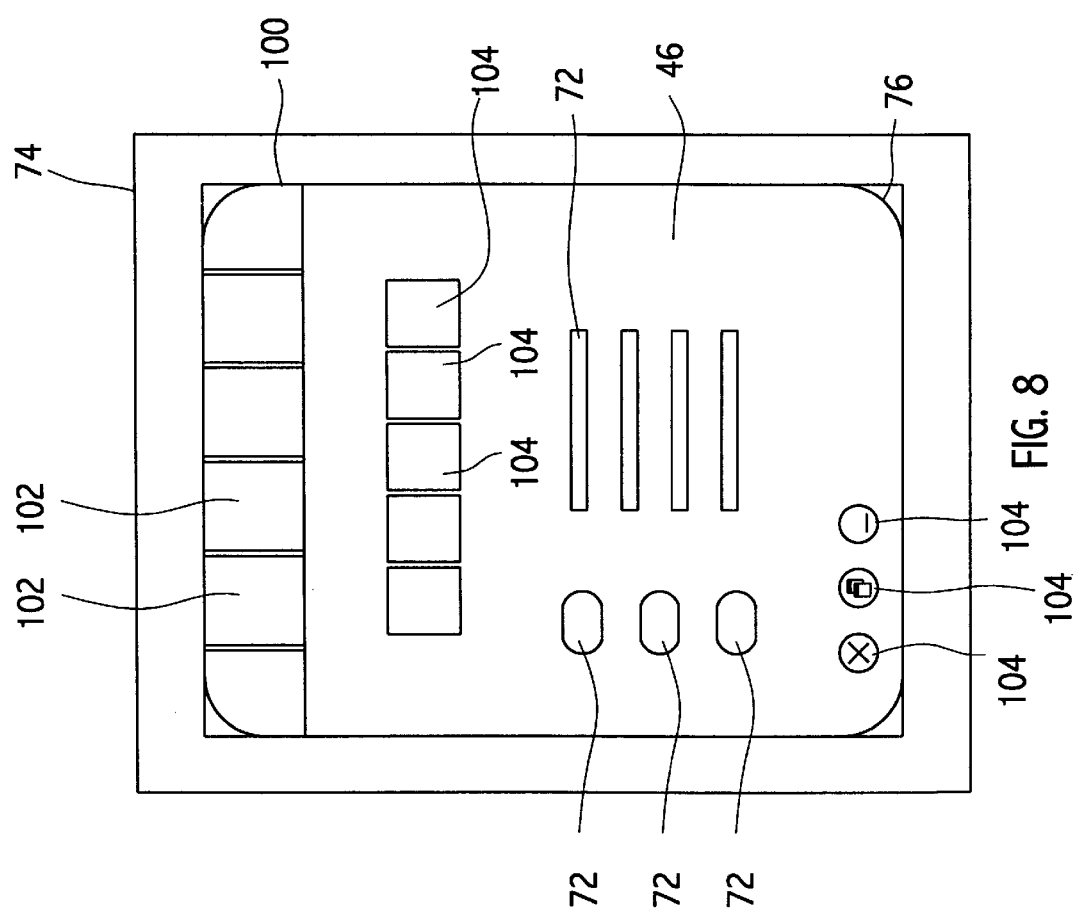
FIG. 8 is a perspective diagram of the computer system user interface in FIG. 7.

FIG. 6 is another computer system 90 according to the invention. FIG. 7 is a perspective diagram of a user interface 100 of the computer system 90. The difference between the computer systems 90 and 40 is that the application 92 of computer system 90 further comprises a plurality of application function modules 96 and a user interface generation module 98. When the application 92 is initiated, the user interface generation module 98 of the application 92 generates a user interface 100 at a predetermined position on the display frame 74. The user interface 100 comprises a plurality of application function icons 102, and each of the application function icons 102 is corresponding to one of the application function module 96. When the user of the computer system 40 selects an application function icon 102, the application function module 96 corresponding to the application function icon 102 selected is initiated to enable the application 92 to execute a specific application function.

In other words, the application function icons 102 and the function icons 104 in the computer system 90 provide the same application functions as the function icons 70 in the computer system 40.

Compared with the prior art, the application according to the invention does not include a browser engine. By interaction with a browser engine the application performs the same functions as a prior art browser application. The application sends a request to the browser engine to enable the browser engine to download a browser display. The browser display comprises function icons for making requests to the application and communication icons for network interlinking so that the browser engine can interact with the application via the browser display. Because the browser display can be considered a browser interface, it can also be quickly downloaded and easily updated. From a user's perspective, downloading a new browser display is the same thing as having a new browser application, which substantially satisfies users' needs for the latest product.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for interaction between a browser engine and an application, said application comprising a plurality of function modules and a reshaping module and said method comprising the steps of:

initiating said application to send a request to the browser engine;

receiving the request and downloading a browser display and a plurality of margin coordinates in response to the request from the browser engine, said plurality of margin coordinates being transmitted to said application by the browser engine, wherein said browser display comprises a plurality of function icons and each of the function icons corresponds to one of the function modules of said application;

initiating the reshaping module to form a margin line on the browser display according to the plurality of margin coordinates and to delete the display region beyond said margin line; and initiating the function module of said application corresponding to said function icon from the browser engine when said function icon being selected so that said application executing a specific function.

2. The method of claim 1, wherein said browser display further comprises a plurality of communication icons, and the browser engine comprises a plurality of communication modules, each of the communication icons corresponding to a communication module, wherein said communication module is initiated by the browser engine for network communication when the corresponding communication icon is selected.

3. The method of claim 2, wherein when the communication icon is selected for network communication, the browser engine opens a browser application to generate a browser application display, and displays a downloaded content web page on the browser application display.

4. The method of claim 1, wherein when said application is initiated, a display frame is generated by said application, and said browser display downloaded by the browser engine is displayed on said display frame.

5. The method of claim 4, wherein said application further comprises a plurality of application function modules, when said application is initiated a user interface being generated by said application and displayed at a predetermined position on said display frame, said user interface comprising a plurality of application function icons, each of said application function icons corresponding to one of said application function modules, and when one of said application function icons is selected, said application function module corresponding to a application function icon is initiated to execute a specific application function.

6. A computer system comprising:
    an application comprising: an initiation module for initiating said application to send a request to a browser engine, a plurality of function modules, and a reshaping module; and
    a browser engine comprising: a download module for downloading a browser display and a plurality of margin coordinates in response to the request, wherein said plurality of margin coordinates are transmitted to said application by the browser engine, said reshaping module forms a margin line on said browser display according to the plurality of margin coordinates and deletes the display region beyond said margin line, and said browser display comprises a plurality of function icons and each of the function icons corresponds to one of the function modules of said application, and wherein the function module of said application corresponding to said function icon is initiated when said function icon is selected, so that said application executes a specific function.

7. The system of claim 6, wherein said browser display further comprises a plurality of communication icons, and the browser engine comprises a plurality of communication modules, each of the communication icons corresponding to a communication module, the communication module is initiated by the browser engine for network communication when one of the communication icons is selected.

8. The system of claim 7, wherein when the communication icon is selected for network communication, the browser engine opens a browser application to generate a browser application display, and displays a downloaded content web page on the browser application display.

9. The system of claim 6, wherein said application further comprises a frame module, and a display frame is generated by said frame module when said application is initiated, and said browser display downloaded by the browser engine is displayed on said display frame.

10. The system of claim 9, wherein said application further comprises a plurality of application function modules and a user interface generation module, a user interface is generated by said user interface generation module and displayed at a predetermined position on said display frame when said application is initiated, wherein said user interface comprises a plurality of application function icons, each of the application function icons corresponding to one of said application function modules, when one of said application function icons is selected, an application function module corresponding to said application function icon is initiated to execute a specific application function.

11. A browser display stored in a server, the browser display comprising:
    a plurality of function icons, each of said function icons being corresponding to one of function modules of an application program stored in a client computer, said application program comprising:
        an initiation module for initiating said application to send a request to a browser engine stored in the client computer;
        a plurality function modules corresponding to said function icons; and
        a shaping module;
    and the browser engine comprising a download module for downloading said browser display and a plurality of margin coordinates according to the request, wherein said plurality of margin coordinates are transmitted to said application by the browser engine, said reshaping module forms a margin line on said browser display according to the plurality of margin coordinates and deletes the display region beyond said margin line;
    wherein the function module of said application corresponding to said function icon is initiated by the browser engine so that said application executes a specific function when said function icon is selected.

12. The browser display of claim 11, wherein said browser display further comprises a plurality of communication icons, the browser engine comprises a plurality of communication modules, each of the communication icons corresponding to one of the communication modules, and the communication module corresponding to the communication icon is initiated by the browser engine for network communication when one of the communication icons is selected.

13. The browser display of claim 12, wherein when the communication icon is selected for network communication, the browser engine opens a browser application to generate a browser application display, and displays a downloaded content web page on the browser application display.

14. An application executed in a computer system comprising:
    an initiation module for initiating said application to send a request to a browser engine stored in the computer system, wherein the browser engine comprises a download module for downloading a browser display and a plurality of margin coordinates in response to the request, said browser display comprises a plurality of function icons and said plurality of margin coordinates are transmitted to said application by the browser engine;
    a reshaping module for forming a margin line on the browser display according to the plurality of margin coordinates and deleting the display region beyond said margin line; and
    a plurality of function modules, wherein each of the function icons of said browser display corresponds to one of the function modules of said application and the function module of said application corresponding to said function icon is initiated by the browser engine so that said application executes a specific function when said function icon is selected.

15. The application of claim 14, wherein said application further comprises a frame module, a display frame is generated by said frame module when said application is initiated, and said browser display downloaded by the browser engine is displayed on said display frame.

16. The application of claim 15, wherein said application further comprises a plurality of application function modules and a user interface generation module, a user interface is generated by said user interface generation module and displayed at a predetermined position on said display frame when said application is initiated, and said user interface comprises a plurality of application function icons, each of said application function icons corresponding to one of said application function modules, said application function module corresponding to said application function icon is initiated to execute a specific application function when one of said application function icons is selected.

* * * * *